(12) United States Patent
Park et al.

(10) Patent No.: US 8,392,969 B1
(45) Date of Patent: Mar. 5, 2013

(54) METHOD AND APPARATUS FOR HOSTING MULTIPLE TENANTS IN THE SAME DATABASE SECURELY AND WITH A VARIETY OF ACCESS MODES

(75) Inventors: Thom Orr Park, Pleasanton, CA (US); James Lee Showalter, Los Gatos, CA (US); Jeffrey Moreno Collins, San Mateo, CA (US); Deepak Goel, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 654 days.

(21) Appl. No.: 12/486,701

(22) Filed: Jun. 17, 2009

(51) Int. Cl.
*H04L 29/06* (2006.01)
*G06F 7/00* (2006.01)
*G06F 17/30* (2006.01)
*G06F 15/16* (2006.01)

(52) U.S. Cl. ............. 726/4; 726/1; 726/2; 726/3; 726/5; 726/6; 726/7; 726/8; 707/758; 707/790; 707/791; 707/792; 707/793; 707/794; 707/795; 707/796; 707/802; 709/203; 709/217; 709/218; 709/219

(58) Field of Classification Search .................. 726/1–8, 726/26–30; 709/203, 217–219; 707/600–602, 707/705–708, 758, 790–796, 802
See application file for complete search history.

(56) References Cited

U.S. PATENT DOCUMENTS

| | | | |
|---|---|---|---|
| 6,275,941 B1 * | 8/2001 | Saito et al. .......................... | 726/2 |
| 6,363,389 B1 * | 3/2002 | Lyle et al. ...................... | 707/695 |
| 6,732,100 B1 * | 5/2004 | Brodersen et al. ..................... | 1/1 |
| 8,006,294 B2 * | 8/2011 | Kikuchi ............................ | 726/8 |
| 8,056,120 B2 * | 11/2011 | Kusakari ........................... | 726/2 |
| 2006/0218630 A1 * | 9/2006 | Pearson et al. ..................... | 726/8 |
| 2008/0010243 A1 * | 1/2008 | Weissman et al. ................ | 707/2 |
| 2008/0021997 A1 * | 1/2008 | Hinton .......................... | 709/225 |
| 2009/0007248 A1 * | 1/2009 | Kovaleski ......................... | 726/8 |
| 2009/0119763 A1 * | 5/2009 | Park et al. ......................... | 726/8 |
| 2009/0126000 A1 * | 5/2009 | Andreev et al. .................... | 726/8 |
| 2009/0260066 A1 * | 10/2009 | Miller et al. ....................... | 726/6 |
| 2009/0288153 A1 * | 11/2009 | Nakazawa ........................ | 726/6 |
| 2009/0307756 A1 * | 12/2009 | Kang ................................ | 726/4 |
| 2010/0229226 A1 * | 9/2010 | Yasrebi et al. .................... | 726/6 |
| 2010/0299738 A1 * | 11/2010 | Wahl ................................ | 726/9 |

FOREIGN PATENT DOCUMENTS

EP 1089516 * 11/2006

* cited by examiner

*Primary Examiner* — Catherine Thiaw
(74) *Attorney, Agent, or Firm* — Osha Liang LLP

(57) ABSTRACT

A method for managing multi-tenancy database access, including receiving credentials from a user associated with a first organization and a second organization, validating the credentials received from the user, logging the user into an access module, generating a first realm ID associated with the credentials and a first access type, generating a second realm ID associated with the credentials and a second access type, storing the first realm ID, the second realm ID, and the credentials in an authentication module, generating a connection request, establishing a connection from the access module to a data repository based on the connection request, generating a first identifier associated with the first realm ID and a second identifier associated with the second realm ID after establishing the connection; and storing the first identifier, the first realm ID, the second identifier, and the second realm ID in the data repository.

14 Claims, 12 Drawing Sheets

| REALM_ID | IDENTIFIER | VERSION | CREATEDBY | CREATIONDATE | LASTMODIFICATIONDATE | LASTMODIFIEDBY | NAME | CLASS | TYPE |
|---|---|---|---|---|---|---|---|---|---|
| TROIHBJNDI | 870322314 | 1.1 | ABC | 01/01/09 | | 01/24/09 | ABC | P1 | P | X |
| DBJLDISJGS | 347569352 | 1.2 | DEF | 02/05/09 | | 02/18/09 | DEF | P2 | P | Y |
| TROIHBJNDI | 767439236 | 1.3 | ABC | 02/07/09 | | 02/20/09 | ABC | Q3 | Q | Z |
| DBJLDISJGS | 317845263 | 1.4 | TJK | 03/01/09 | | 03/15/09 | DEF | P4 | P | Y |

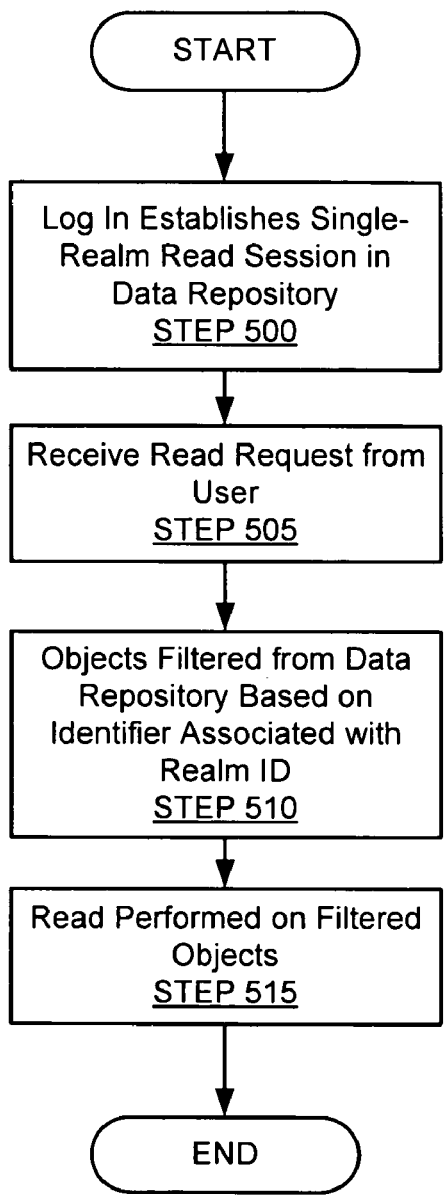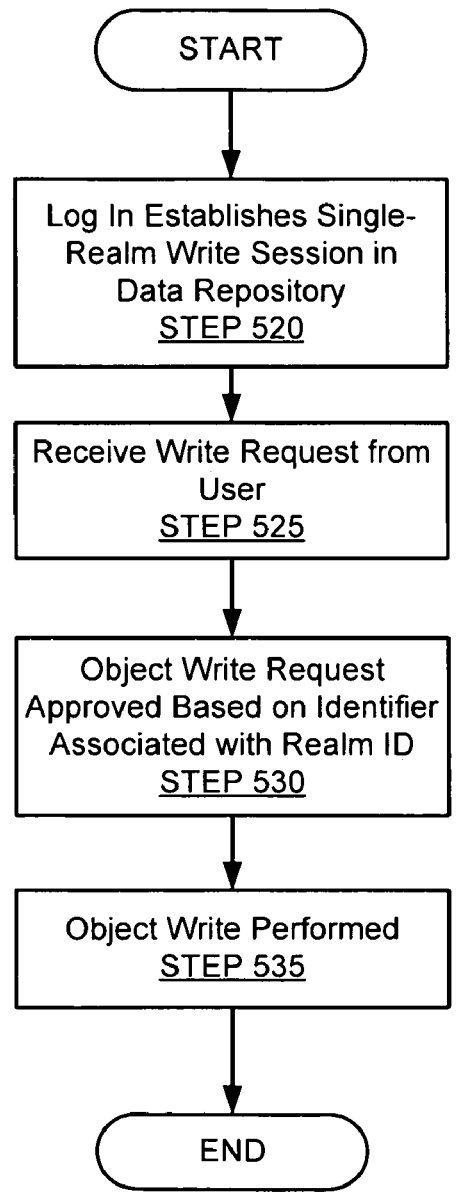
FIG. 5A                    FIG. 5B

METHOD AND APPARATUS FOR HOSTING MULTIPLE TENANTS IN THE SAME DATABASE SECURELY AND WITH A VARIETY OF ACCESS MODES

BACKGROUND

A database is a structured collection of data that is stored in a computer system. The data is typically organized according to a database model such as a relational model. Other models including the hierarchical model and the network model use a more explicit representation of relationships between objects and data. Database technology has become a pervasive and essential element of the corporate infrastructure. Corporations around the world use databases to manage everything from inventory, customers, sales, marketing, IT, human resources, business development, and many other facets of the business ecosystem.

Corporations often employ many people and have an intricate web of corporate relationships. For example, many companies are actually holding companies for other companies, or have many subsidiaries. These corporations, for example, need to be able to manage their employee records such that employee records of one company are kept separate from those of the other companies—however they also want to keep all company records in one data center for simplicity and manageability sake. One approach is to maintain multiple separate databases, one for each company, however if a corporation owns thousands of companies, managing and administering thousands of databases provides for an extremely complex and demanding task.

Separation of data belonging to separate entity domains (e.g. corporations or customers) is extremely important for companies. Only data owned by a particular company or customer should viewable by that company or customer. All other data should be implicitly invisible to non owners of that data. Thus, secure data isolation is an important requirement of any database system that contains data of more than one entity.

SUMMARY

In general, in one aspect, the invention relates to a method for managing multi-tenancy database access, comprising receiving credentials from a user, wherein the user is associated with a first organization, and wherein the first organization is associated with a first realm of data access, validating the credentials received from the user, logging the user into an access module upon validating the user, generating a first realm ID associated with the credentials, wherein the first realm ID is associated with an access type permitting the user access to a first predetermined set of data defined by the first realm of data access, storing the first realm ID and the credentials in an authentication module, generating a connection request after storing the first realm ID and the credentials, establishing a connection from the access module to a data repository based on the connection request, generating a first identifier associated with the first realm ID after establishing the connection, and storing the first identifier and the first realm ID in the data repository, wherein the first realm ID is required for access to the first predetermined set of data.

In general, in one aspect, the invention relates to a system for managing multi-tenancy database access, comprising a processor, a memory operatively connected to the processor, a user interface, resident in memory and configured to receive credentials from a user, and receive a request to perform an operation from the user, wherein the user is associated with a first organization, and wherein the first organization is associated with a first realm of data access, an access module, resident in memory and configured to validate the credentials after receiving the credentials, log in the user based on the validation, determine a first realm ID associated with the credentials after logging in the user, wherein the first realm ID is associated with an access type, generate a connection request and establish a connection after determining the first realm ID, obtain a first identifier associated with the first realm ID after establishing the connection, determine a scope of data access based on a first predetermined set of data defined by the first realm of data access, verify the request according to the scope, an authentication module, resident in memory and configured to authenticate the credentials, and a data repository, configured to perform the operation on the first predetermined set of data in response to the request after verification, according to the scope.

Other aspects and advantages of the invention will be apparent from the following description and the appended claims.

BRIEF DESCRIPTION OF DRAWINGS

FIGS. 1 and 2 show a system in accordance with one or more embodiments of the invention.

FIGS. 3-8 show flowcharts in accordance with one or more embodiments of the invention.

DETAILED DESCRIPTION

Figure 1:
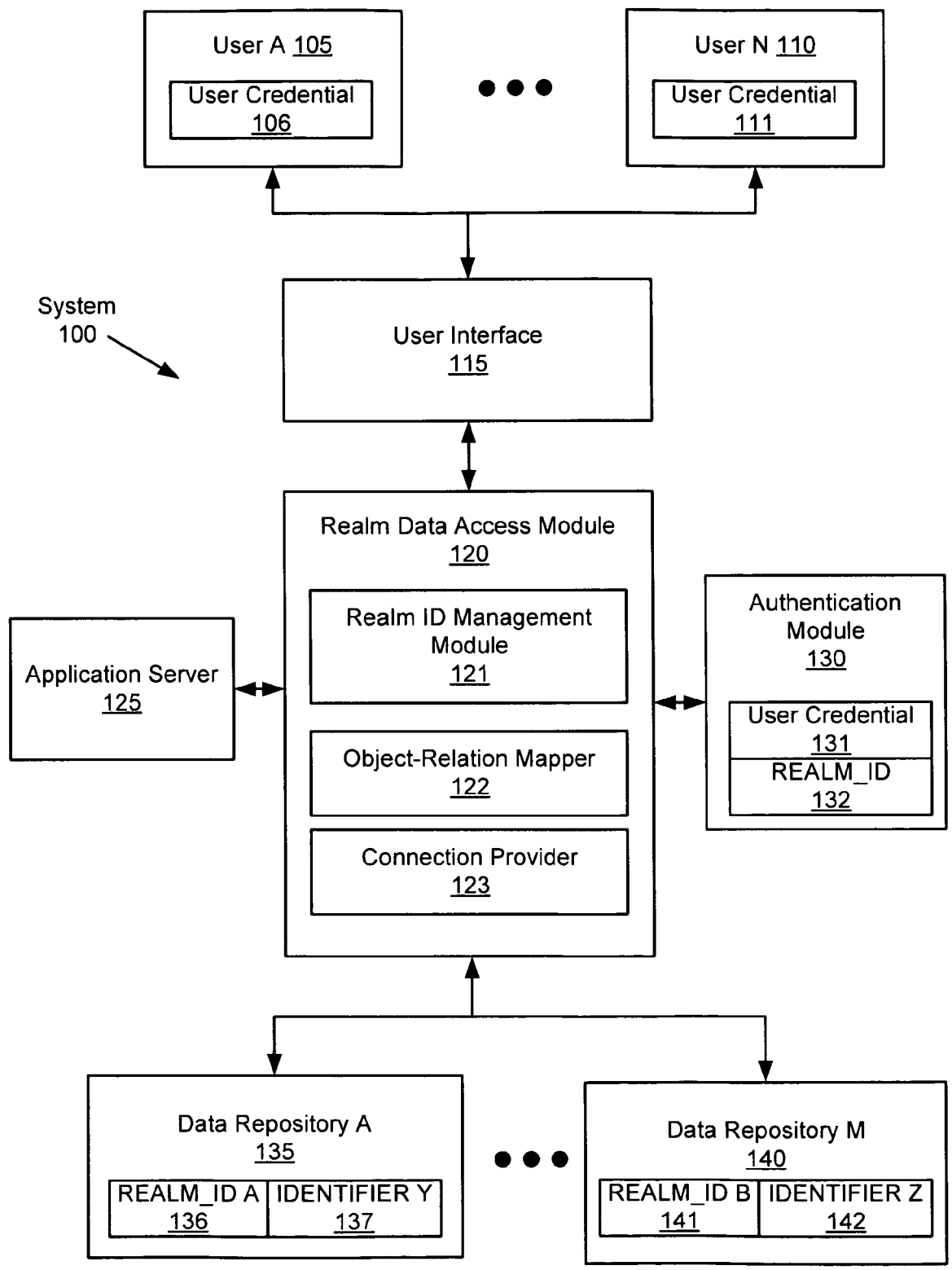

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing multi-tenancy database access. In general, embodiments of the invention provide a system and method for managing multi-tenancy database access based on a first realm ID required for access to data associated with a first realm in a data repository. In general, embodiments of the invention provide a system and method for managing multi-tenancy database access with an access mode of read only multi-realm.

FIG. 1 shows a system (100) in accordance with one or more embodiments of the invention. As shown in FIG. 1, the system (100) has multiple components including a user A (105), a user N (110), a user interface (115), a realm data access module (120), an application server (125), an authentication module (130), a data repository A (135), and a data repository M (140). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one realm data access module, authentication module, application server, and user interface running on a device, as well as more than one user and data repository interfacing with those components.

In one or more embodiments of the invention, a user A (105) interacts with the system (100). As depicted by user N (110), there may be various users interacting with the system (100), alone or concurrently. Each user may have user credentials (e.g. user credentials (106) and user credentials (111)), that determine user access to the system (100). User credentials may include security mechanisms (e.g. usernames, passwords, and the like), may be encoded in various formats (e.g. strings, integers, longs, and the like), and may be encrypted with various algorithms (e.g. DES, AES, RSA, and the like). Those skilled in the art will appreciate that there will be various other security mechanisms, formats, and encryption algorithms utilized by user credentials.

In one or more embodiments of the invention, a user interface (115) may display information associated with the realm data access module (120). The user interface (115) may be viewed in a web browser, an application window, and the like. The user interface (115) may be viewed in these display technologies by a user of the realm data access module (120). The user interface (115) may include standard web elements, including video, audio, and text, as well as interface technologies not limited to text submission on forms, voice capture, and user gesture interpretation. Those skilled in the art will appreciate that there may be various other display and interface technologies used by and for viewing, and interfacing with, the user interface (115).

In one or more embodiments of the invention, a realm data access module (120) consists of a realm ID management module (121), an object-relation mapper (122), and a connection provider (123). In one or more embodiments of the invention, the realm data access module (120) performs computations on data associated with the system (100) for managing multi-tenancy database access. The realm ID management module (121) may perform operations associated with access of the authentication module (130), as well as transfer of data associated with user credentials and realm IDs. Those skilled in the art will appreciate that there will be many mechanisms by which the realm ID management module (121) may access and transfer this data. The realm data access module (120) may also be referred to by other names, including for instance, an access module, realm module, and realm data module.

The object-relation mapper (122) may provide a means to map objects (e.g. plain old java objects) to tables held in the data repository A (135). The object-relation mapper (122) may use various protocols (e.g. JDBC (Java Database Connectivity)) to access the data repository A (135). When the object-relation mapper (122) needs to interact with the data repository A (135), it may invoke the connection provider (123). Those skilled in the art will appreciate that there will be various object formats, protocols, and technologies that the object-relation mapper (122) may utilize to map objects to tables in the data repository A (135).

The connection provider (123) may obtain a connection (e.g. a JDBC connection) from a pool of connections for the object-relation mapper (122) to interact with the data repository A (135). If the connection pool does not contain any available connections, the connection provider (123) may wait for a connection to become available from the pool. The connection provider (123) may further abort the connection attempt if no connections become available from the pool after a predetermined time period. Those skilled in the art will appreciate that the connection provider (123) may execute numerous well known algorithms in an attempt to acquire a connection from the connection pool, not limited to those described.

In one or more embodiments of the invention, an application server (125) may host the realm data access module (120). The application server (125) may be a software based server (e.g. an html server), or a hardware server. Those skilled in the art will appreciate that the application server (125) may host multiple realm data access modules, alone or concurrently.

In one or more embodiments of the invention, an authentication module (130) is the authentication authority for authorizing and authenticating users. In addition to name and role permissions, the authentication module (130) may contain user credentials and realm IDs (e.g. realm_ID (132)) associated with a property (e.g. a realm) for differentiating data groupings. The realm_ID (132) may correspond to a unique identifier of a realm. A realm may be defined as an entity that represents the abstraction for the context within which an authorization applies. A user that is assigned a role within an offering has permissions contained within the role scoped by the realm. A realm may represent a company (i.e. organization), a user (i.e. individual), or a household.

In one or more embodiments of the invention, a data repository A (135) may contain data associated with the realm data access module (120). The data repository A (135) may be a relational database that stores data entries associated with the realm data access module (120). The data repository A (135) may contain tables organized into rows and columns. The tables in the data repository A (135) and M (140) may contain elements including realm IDs (e.g. realm_ID A (136), identifier Y (137), realm_ID B (141), and identifier Z (142), respectively). The data repository A (135) may also be an excel spreadsheet containing data cells associated with the realm data access module (120). The data repository A (135) may also contain personal identifiable information (i.e. PII). Without proper authentication, a user may not be granted access to the PII or other sensitive data in the data repository A (135). The PII may be encrypted in the data repository A (135) to ensure its integrity and security. Those skilled in the art will appreciate that the data repository A (135) may be implemented with many other technologies and schemes not described.

In one or more embodiments of the present invention, multiple customers' data may be stored in the data repository A (135), requiring data isolation. For example, no one customer's data should be visible to another customer and vice-versa. This requirement is often termed "multi-tenancy". Database multi-tenancy is a term used to describe supporting multiple clients' datasets on a shared set of database tables. Instead of employing many different schemas on separate database instances, the data is shared in the same physical schema and client access to that data is limited either by some form of permission scheme or by some token that identifies which the logical entity to which the client belongs to. For example, company-id might be a good candidate to ensure that a user only has access to data that belonged to the company he is a representative of. The critical requirement of multi-tenancy is that no client can see or alter another client's data unless permitted to do so.

FIG. 2 shows a multi-tenancy table (200) in accordance with one or more embodiments of the invention. As shown in FIG. 2, the multi-tenancy table (200) has multiple rows and columns that describe data in the multi-tenancy table (200) (e.g. including columns such as REALM_ID, IDENTIFIER, VERSION, CREADTEDBY, CREATIONDATE, LAST- MODIFICATIONDATE, LASTMODIFIEDBY, NAME, CLASS, and TYPE). The REALM_ID column may describe data pertaining to the realm ID of a user (e.g. a string). The IDENTIFIER column may describe data pertaining to an identifier associated with the realm ID (e.g. the IDENTIFIER may be a randomly generated or pseudo-randomly generated integer or long-integer, a long-integer of 40 or more digits, and the like). The CREADTEDBY column may describe data identifying a user that created the data in the current row (e.g. a string). The CREATIONDATE column may describe data pertaining to a date of creation of the data in the current row (e.g. in a month/day/year format). The LASTMODIFICATIONDATE column may describe data pertaining to a date of the most recent modification of the data in the current row (e.g. in a month/day/year format). The LASTMODIFIEDBY column may describe data identifying a user that most recently modified the data in the current row (e.g. a string). The NAME column may describe data pertaining to an identifier of the data in the current row (e.g. a string). The CLASS column may describe data pertaining to the class of the data in the current row (e.g. a string). The TYPE column may describe data pertaining to the type of the data in the current row (e.g. a string). Those skilled in the art will appreciate that there may be numerous other types of data in the multi-tenancy table ( ).

Figure 3:
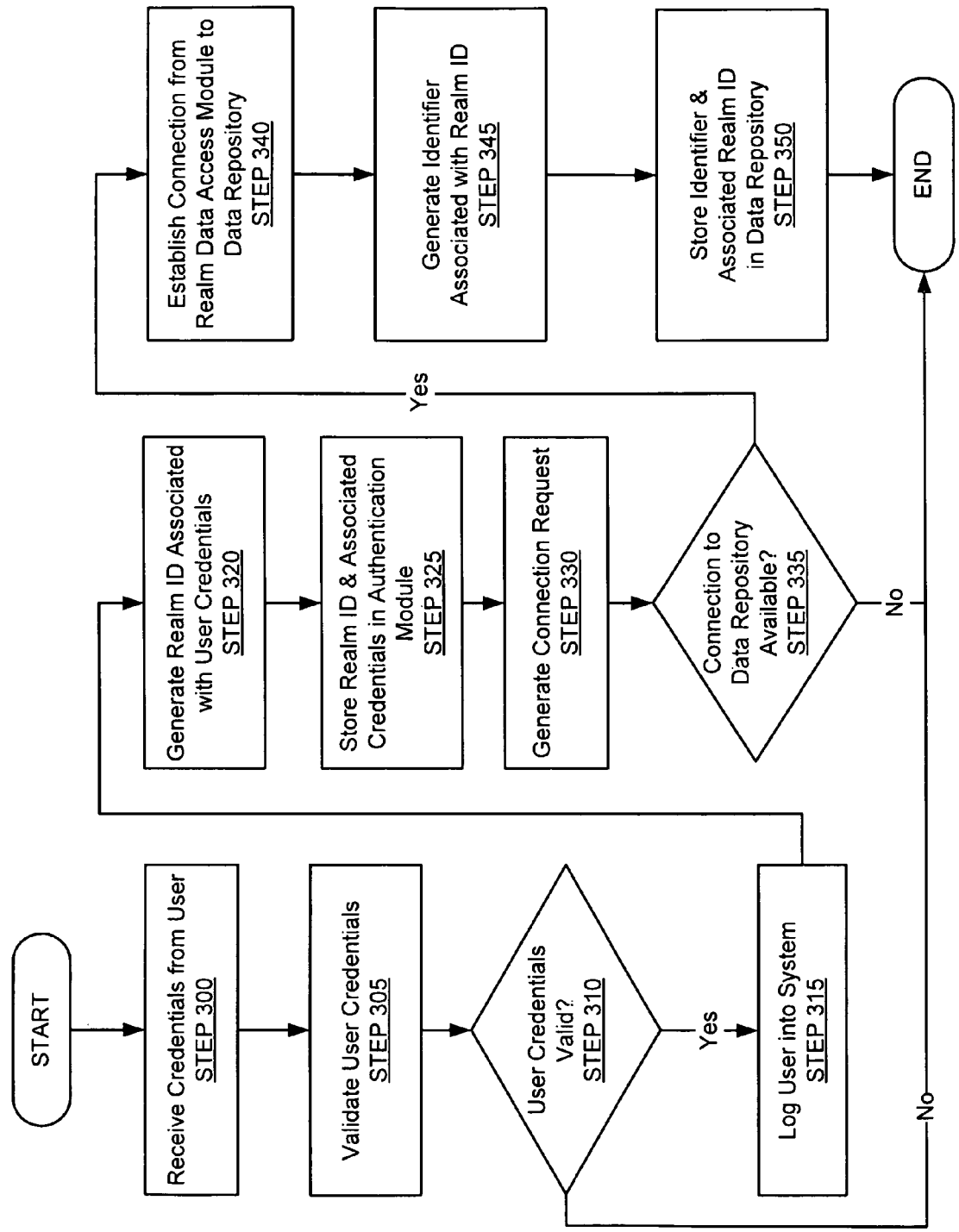

FIG. 3 shows a flowchart depicting a setup of system (100) in accordance with one or more embodiments of the invention. The process shown in FIG. 3 may be used, for example, with the system (100), for managing multi-tenancy database access. Those skilled in the art will appreciate that the sequence of steps shown in FIG. 3 may differ among embodiments of the invention, and that one or more of the steps may be optional.

In STEP 300, credentials may be received (e.g. from a user). As mentioned above, user credentials may include security mechanisms (e.g. usernames, passwords, and the like), may be encoded in various formats (e.g. strings, integers, longs, and the like), and may be received and transmitting via encryption with various algorithms (e.g. DES, AES, RSA, and the like).

In STEP 305, the user credentials may be validated (e.g. by the authentication module (130)). Validation may include verification of the username, password, and other portions of the user credentials. Such a validation may include a check for authenticity and integrity, using handshake, encryption, and other similar mechanisms known to those skilled in the art.

In STEP 310, a determination may be made as to whether the user credentials are valid or not (e.g. by the authentication module (130)). If the user credentials are found to be valid, the process may proceed to STEP 315, otherwise it may end. Alternatively, if the user credentials are not found to be valid, the authentication module (130) may make a request for new user credentials (e.g. to the user through the user interface (115)), and may subsequently make a determination of the validity of the new user credentials. Those skilled in the art will appreciate that there may be various other mechanisms for determining the validity of user credentials.

In STEP 315, the user is logged into the system (100) (e.g. by the realm data access module (120)). Logging a user into the system (100) is performed only after the user credentials have been validated. Without a validation, a user may not be logged into the system (100). Once a user is logged into the system (100), the user may have access to certain data associated with the user credentials.

In STEP 320, a realm ID associated with the user credentials may be generated (e.g. by the authentication module (130)). As mentioned above, a realm ID (such as realm_ID (132))) may correspond to a unique identifier of a realm. A realm ID may enable access to data associated with a specific realm in the data repository A (135). Users that lack proper user credentials and a realm ID will not have access to data in the data repository A (135). The realm ID may be a unique character string, generated in a random, pseudo-random, or other fashion. Those skilled in the art will appreciate that the realm ID may be generated by numerous algorithms not described.

In STEP 325, the realm ID and associated user credentials may be stored in the authentication module (130). The realm ID—user credential set may be unique (i.e. each set may not be duplicated). The realm ID—user credential set may act as a mechanism to associate a unique realm ID with user credentials. The realm ID—user credential set may be securely stored using various encryption techniques.

In STEP 330, a connection request may be generated (e.g. by the connection provider (123)). As mentioned above, the connection provider (123) may obtain a connection (e.g. a JDBC connection) from a pool of connections to the data repository A (135). The connection request is a request to the connection pool for a free and available connection.

In STEP 335, a determination may be made as to whether a connection to the data repository A (135) is available or not (e.g. by the connection provider (123)). If a connection is available, the process may proceed to STEP 340, otherwise the process may end. Alternatively, the connection provider (123) may wait a predetermined time period and attempt to secure a connection from the connection pool by generating another connection request. There may be a predetermined number of attempts performed before the connection provider (123) halts the generation of requests. Those skilled in the art will appreciate that there may be various other schemes utilized by the connection provider (123) to secure a connection to the data repository A (135).

In STEP 340, a connection may be established from the realm data access module (120) to the data repository A (135) (e.g. by the connection provider (123)). The connection may only be established if the connection is available from the pool of connections. Once the connection is established, the user may have access to the data repository A (135).

In STEP 345, an identifier associated with the realm ID may be generated (e.g. by the data repository A (135)). Each realm ID may have a unique identifier within the data repository A (135). The identifier may be a unique integer, and may be generated randomly, pseudo-randomly, or according to other similar algorithms. Those skilled in the art will appreciate that identifiers may be generated using various algorithms not described.

In STEP 350, the identifier and associated realm ID may be stored in the data repository A (135) (e.g. by the data repository A (135)). The identifier-realm ID set may be unique (i.e. each set may not be duplicated) within the data repository A (135). The identifier-realm ID set may act as a mechanism to associate a unique identifier with a realm ID. The identifier-realm ID set may be securely stored using various encryption techniques known to those skilled in the art.

In accordance with one or more embodiments of the invention, the authentication module (130) may maintain both realm IDs as well as identifiers. In this case, the identifier may be stored and obtained from the authentication module (130), and the data repository A (135) may be provided the identifier by the authentication module (130) when required. An advantage associated with storing both the realm IDs and the identifiers in the authentication module (130) may occur when data is stored in multiple data repositories, and if identical identifiers are assigned to multiple data repositories. In this case, if identifiers are managed by the authentication module (130), then they may match and persist across multiple databases.

Figure 4:
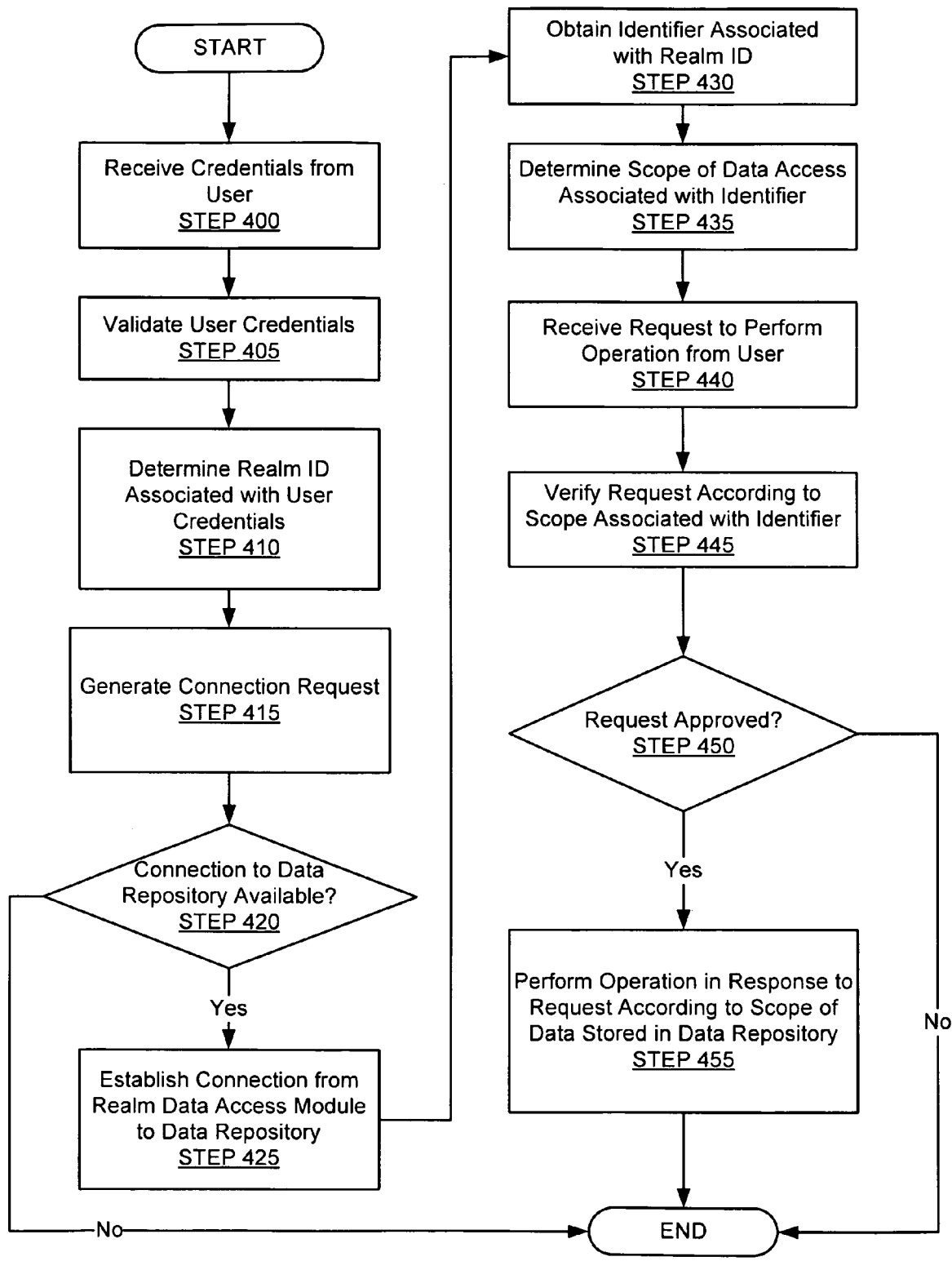

FIG. 4 shows a flowchart depicting usage of system (100) in accordance with one or more embodiments of the invention. The process shown in FIG. 4 may be used, for example, with the system (100), for managing multi-tenancy database access. Those skilled in the art will appreciate that the sequence of steps shown in FIG. 4 may differ among embodiments of the invention, and that one or more of the steps may be optional.

In STEP 400, credentials may be received (e.g. from a user). See STEP 300 for further details.

In STEP 405, the user credentials may be validated (e.g. by the authentication module (130)). See STEP 305 for further details.

In STEP 410, the realm ID associated with the user credentials may be identified (e.g. by the authentication module (130)). The realm ID may be identified by the authentication module (130) according to its association with the user credentials. As previously described, each user credential-realm ID set stored in the authentication module (130) is unique, and therefore once a user credential is obtained, the corresponding realm ID may be uniquely identified.

In STEP 415, a connection request may be generated (e.g. by the connection provider (123)). See STEP 330 for further details.

In STEP 420, a determination may be made as to whether a connection to the data repository A (135) is available or not (e.g. by the connection provider (123)). See STEP 335 for further details.

In STEP 425, a connection may be established from the realm data access module (120) to the data repository A (135) (e.g. by the connection provider (123)). See STEP 340 for further details.

In STEP 430, the identifier associated with the realm ID may be obtained (e.g. from the data repository A (135)). The identifier may be identified according to its association with the realm ID. As previously described, each identifier-realm ID set stored in the data repository A (135) is unique, and therefore once a realm ID is obtained, the corresponding identifier may be uniquely identified.

In STEP 435, the scope of data access associated with the identifier may be obtained (e.g. from the realm data access module (120)). The scope of data access determines what type of access the user has to data in the data repository A (135). The scope is associated with the identifier as well as the realm ID and realm the user has access to. For example, if a user only has access the data associated with realm A, then the scope of user access to data in the data repository A (135) will be limited that data associated with realm A.

In STEP 440, a request to perform an operation may be received (e.g. from the user). The operation may be associated with various types of computation (e.g. read, write, read from multiple realms, write to multiple realms, and the like).

In STEP 445, the request may be verified according to the scope (e.g. by the realm data access module (120)). The request may or may not be approved (in STEP 450), according to the scope. For example, if the scope allows a user read only access to a set of data in the data repository A (135), and the request is a request to write to that data, then the request will be denied.

In STEP 450, a determination may be made as to whether or not the request is approved (e.g. by the realm data access module (120)). If the request is approved, then the process may proceed to STEP 455, otherwise the process may end. Alternatively, the system (100) may inform the user through the user interface (115) that the request has been denied, and may obtain a new request from the user. Accordingly, the new request would proceed through STEP 445 again. Those skilled in the art will appreciate that there may be various mechanisms enacted if the request is denied.

In STEP 455, the operation may be performed in response to the request according to the scope of data stored in the data repository A (135) (e.g. by the realm data access module (120)). As previously described, the operation may be associated with various types of computation (e.g. read, write, read from multiple realms, write to multiple realms, and the like). The user may be informed of the execution of the operation, and of its results.

FIGS. 5A and 5B show flowcharts depicting single-realm read and single-realm write access of system (100) in accordance with one or more embodiments of the invention. The process shown in FIGS. 5A and 5B may be used, for example, with the system (100), for managing multi-tenancy database single-realm access. Those skilled in the art will appreciate that the sequence of steps shown in FIGS. 5A and 5B may differ among embodiments of the invention, and that one or more of the steps may be optional.

In STEP 500, a single-realm read session may be established in the data repository (e.g. by logging a user in). A single-realm read session is a session (i.e. a connection to and/or from the data repository A (135)) in which a user is logged into the system (100) with read access to data in the data repository A (135) associated with a single-realm. See STEPS 400-430 for further details.

In STEP 505, a read request may be received (e.g. from a user). The read request may be directed towards data associated with the realm that the user has access to. As previously described, the user will not have access to read data that is not associated with the current realm of the user.

In STEP 510, objects in the data repository A (135) may be filtered for access based on the identifier associated with a realm ID (e.g. by the data repository A (135)). When data is read from the data repository A (135), it is filtered to include only data and objects that are associated with the user's realm (and realm ID). The user therefore cannot see data and objects associated with other realms.

In STEP 515, a read operation may be performed on the filtered objects (e.g. by the data repository A (135)). The read operation will only affect the filtered objects and data, and will not be performed on data that is not within the realm associated with the user's realm ID (and identifier).

In STEP 520, a single-realm write session may be established in the data repository (e.g. by logging a user in). A single-realm write session is a session (i.e. a connection to and/or from the data repository A (135)) in which a user is logged into the system (100) with read and write access to data in the data repository A (135) associated with a single-realm. See STEPS 400-430 for further details.

In STEP 525, a write request may be received (e.g. from a user). The write request may be directed towards data associated with the realm that the user has access to. As previously described, the user will not have access to write to data that is not associated with the current realm of the user.

In STEP 530, the write request may be approved based on the identifier associated with a realm ID (e.g. by the realm data access module (120)). Data may be filtered from the data repository A (135) to include only data and objects that are associated with the user's realm (and realm ID). The user therefore cannot see or write to data and objects associated with other realms. If the write request is approved, the process may proceed to STEP 535, otherwise the process may subsequently end.

In STEP 535, a write operation may be performed on objects in the data repository (e.g. by the data repository A (135)). The write operation will only affect the filtered objects and data, and will not be performed on data that is not within the realm associated with the user's realm ID (and identifier).

Figure 6:
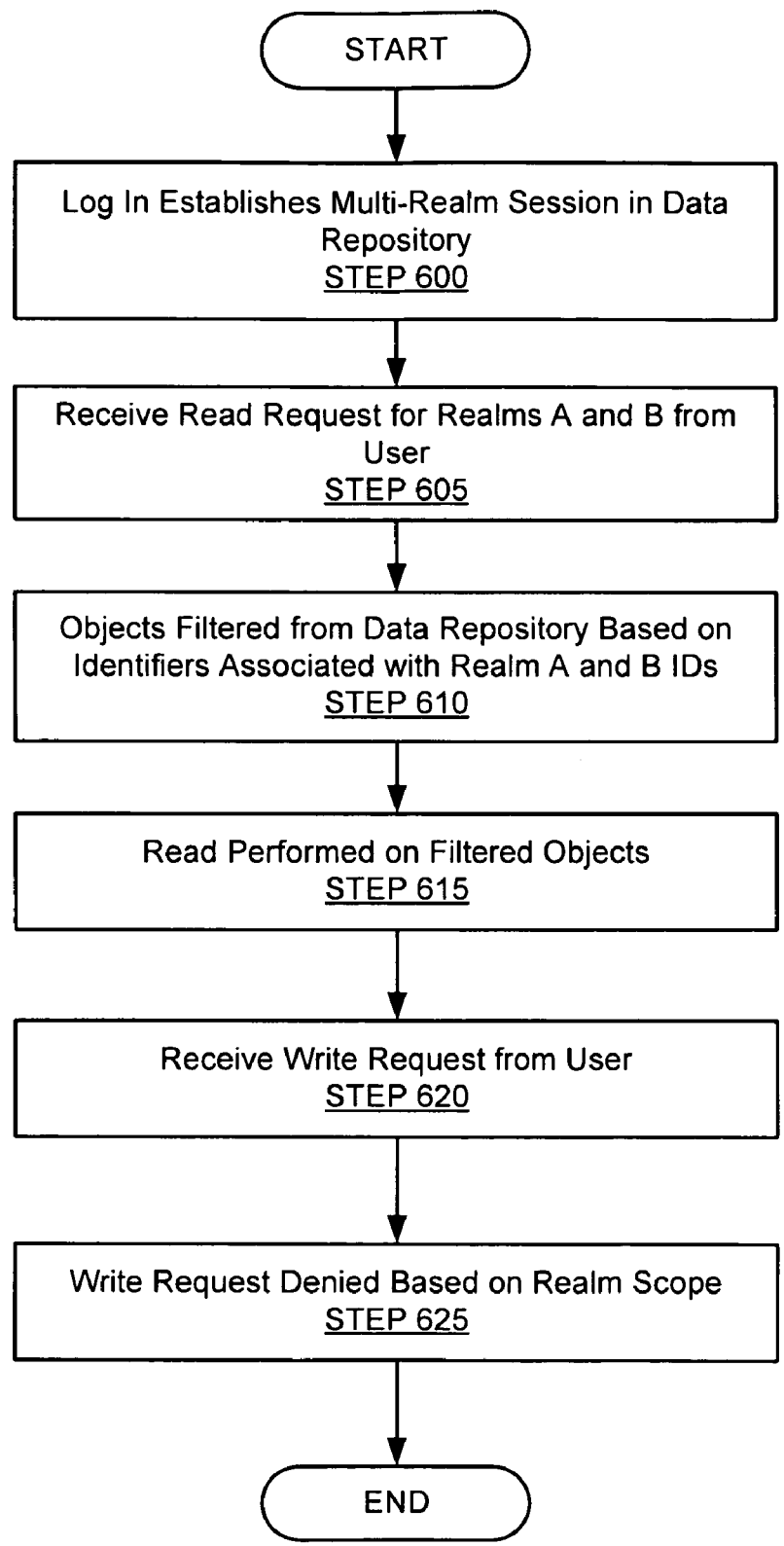

FIG. 6 shows a flowchart depicting multi-realm read only access of system (100) in accordance with one or more embodiments of the invention. The process shown in FIG. 6 may be used, for example, with the system (100), for managing multi-tenancy database multi-realm read only access. Those skilled in the art will appreciate that the sequence of steps shown in FIG. 6 may differ among embodiments of the invention, and that one or more of the steps may be optional.

In STEP 600, a multi-realm read only session may be established in the data repository (e.g. by logging in a user). A multi-realm read only session is a session (i.e. in the data repository A (135), or connection to the data repository A (135)) in which a user is logged into the system (100) with read access to data in the data repository A (135) associated with multiple realms. See STEPS 400-430 for further details.

In STEP 605, a read request for realms A and B may be received (e.g. from the user). The read request may be directed towards data associated with realms A and B that the user has access to. As previously described, the user will not have access to read data that is not associated with the current realms of the user.

In STEP 610, objects in the data repository may be filtered based on identifiers associated with realms A and B IDs (e.g. by the data repository A (135)). When data is read from the data repository A (135), it is filtered to include only data and objects that are associated with the user's realms (e.g. realms A and B). The user therefore cannot see data and objects associated with other realms.

In STEP 615, a read operation may be performed on the filtered objects (e.g. by the data repository A (135)). The read operation will only affect the filtered objects and data, and will not be performed on data that is not within the realms associated with the user's realm IDs (and identifiers).

In STEP 620, a write request may be received (e.g. from the user). The write request may be directed towards data associated with the realms that the user has write access to (e.g. in this case none). Because this is a multi-realm read only session, the user will not have access to write to data of any realm.

In STEP 625, the write request may be denied based on the realm scope (e.g. by the data repository A (135)). The write operation will not be performed on data that is not within the realm scope or permitted operations associated with the current realms (e.g. realms A and B).

Figure 7:
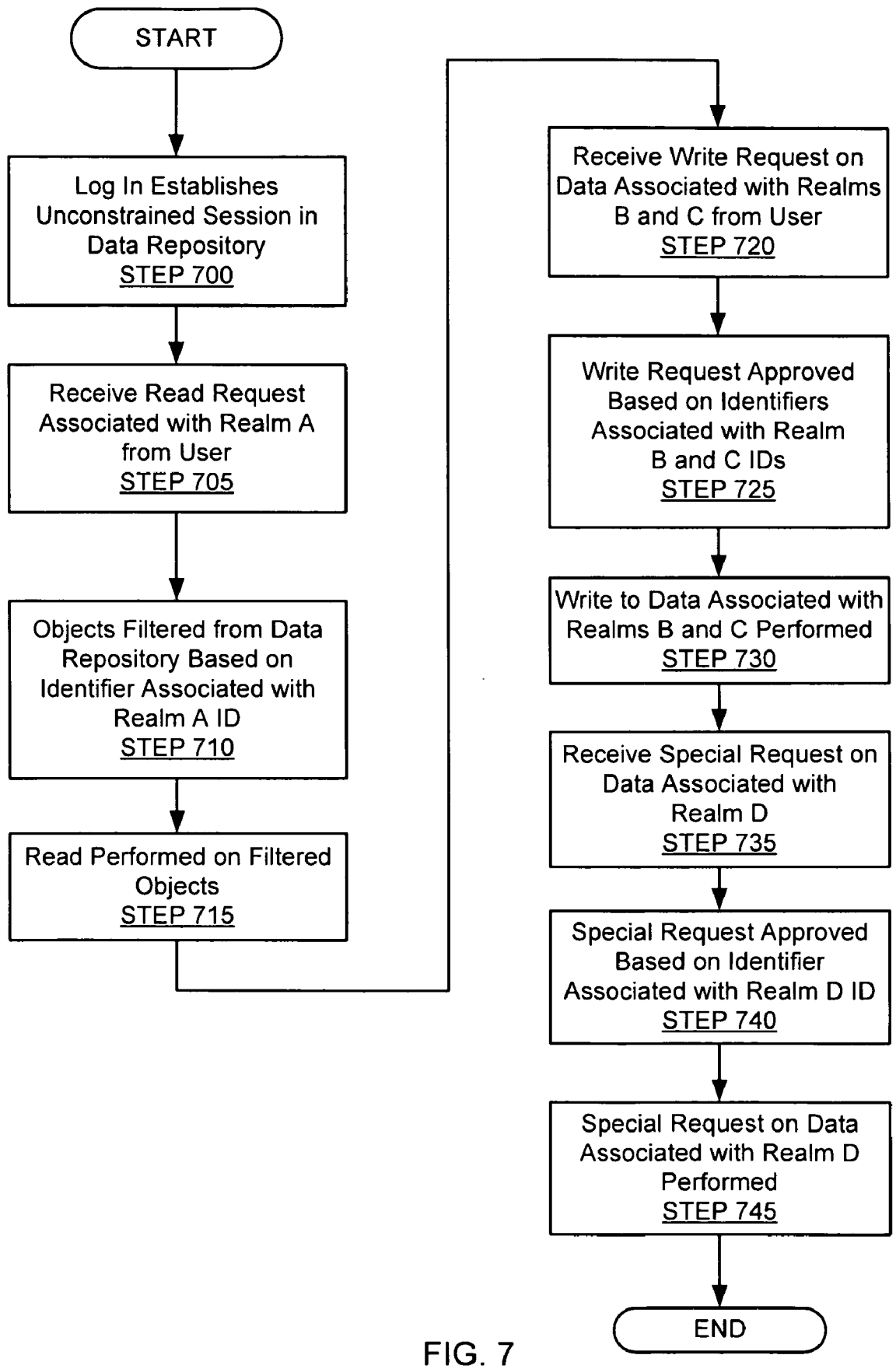

FIG. 7 shows a flowchart depicting unconstrained access of system (100) in accordance with one or more embodiments of the invention. The process shown in FIG. 7 may be used, for example, with the system (100), for managing multi-tenancy database unconstrained access. Those skilled in the art will appreciate that the sequence of steps shown in FIG. 7 may differ among embodiments of the invention, and that one or more of the steps may be optional.

In STEP 700, an unconstrained session may be established in the data repository (e.g. by logging in a user). An unconstrained session is a session (i.e. a connection to and/or from the data repository A (135)) in which a user is logged into the system (100) with unconstrained read and write access to data in the data repository A (135) associated with various realms. An unconstrained user may also be known by other names (e.g. a supervisor). See STEPS 400-430 for further details.

In STEP 705, a read request associated with realm A may be received (e.g. from a user). The read request may be directed towards data associated with realm A that the user has access to. In an unconstrained session, the user will have access to read data from multiple realms.

In STEP 710, objects in the data repository may be filtered based on the identifier associated with the realm A ID (e.g. by the data repository A (135)). When data is read from the data repository A (135), it is filtered to include data and objects that are associated with the user's realms (e.g. realms A). In an unconstrained session, the user will be able to see data and objects from multiple realms.

In STEP 715, a read operation may be performed on the filtered objects (e.g. by the data repository A (135)). The read operation will only affect the filtered objects and data, and will not be performed on data that is not filtered (i.e. within the realms associated with the user's realm IDs (and identifiers)). In an unconstrained session, the user will have access to read data from multiple realms.

In STEP 720, a write request on data associated with realms B and C may be received (e.g. from the user). The write request may be directed towards data associated with the realms that the user has write access to (e.g. realms B and C). In an unconstrained session, the user will have access to write to data from multiple realms.

In STEP 725, the write request may be approved based on the identifiers associated with realm B and C IDs (e.g. by the realm data access module (120)). Data may be filtered from the data repository A (135) to include only data and objects that are associated with the realms associated with the user's request (e.g. realms B and C).

In STEP 730, the write operation may be performed on data associated with realms B and C (e.g. by the data repository A (135)). The write operation will only effect the filtered objects and data, and will not be performed on data that is not associated with the realms of the write request (e.g. realms B and C).

In STEP 735, a special request may be received for data associated with realm D (e.g. from a user). The special request may be directed towards data associated with the realms that the user has read and write access to (e.g. realms D). The special request may be, for example, a request to read data from realm D and to subsequently write to data from realm D. A special request may also be, for example, a request to perform a bulk load (e.g. writes) of data from various realms into one realm. A special request may further be, for example, a request to read data from a realm and write that data into several other realms. In an unconstrained session, the user will have access to read and write to data from multiple realms. Those skilled in the art will appreciate that a special request may embody many other functionalities not described.

In STEP 740, the special request may be approved based on the identifier associated with the realm D ID (e.g. by the realm data access module (120)). Data may be filtered from the data repository A (135) to include only data and objects that are associated with the realm associated with the user's request (e.g. realms D).

In STEP 745, the special request may be performed on data associated with realm D (e.g. by the data repository A (135)). The special operation will only affect the filtered objects and data, and will not be performed on data that is not within the realms associated with the user's special request (e.g. realm D).

Figure 8:
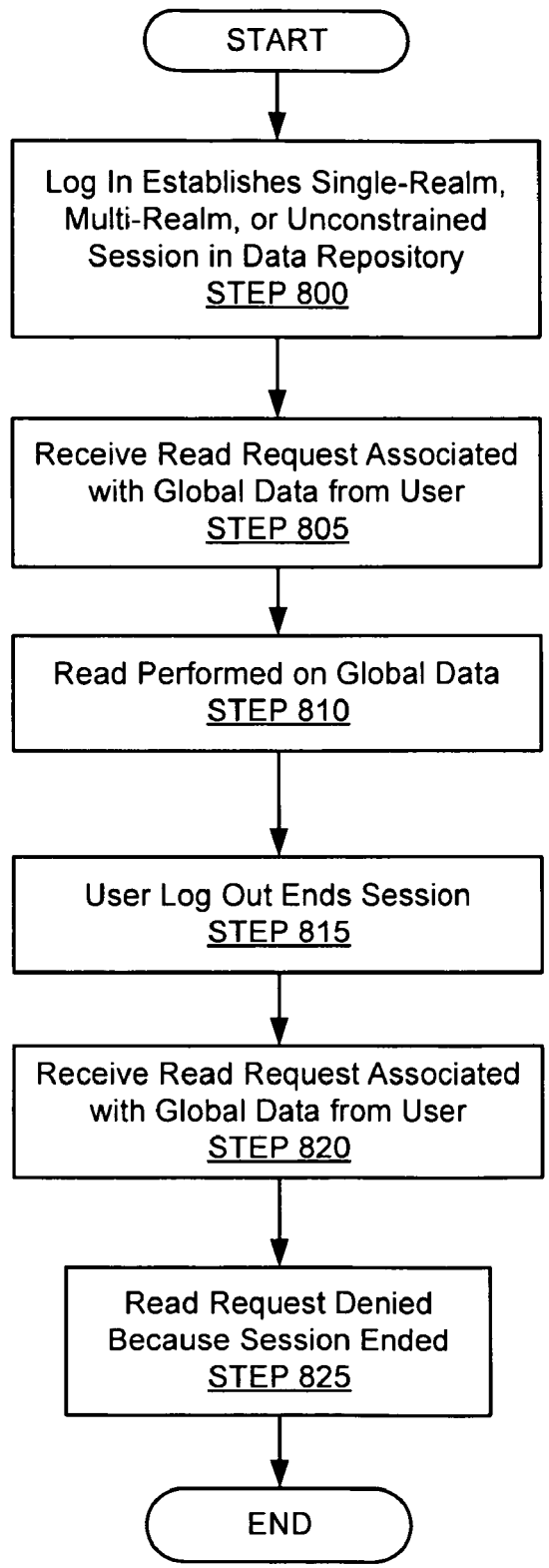

FIG. 8 shows a flowchart depicting global read access of system (100) in accordance with one or more embodiments of the invention. The process shown in FIG. 8 may be used, for example, with the system (100), for managing multi-tenancy database global read access. Those skilled in the art will appreciate that the sequence of steps shown in FIG. 8 may differ among embodiments of the invention, and that one or more of the steps may be optional.

In STEP 800, a single-realm, multi-realm, or unconstrained session may be established in the data repository A (135) (e.g. by logging in a user). As previously described, a single-realm, multi-realm, or unconstrained session is a session (i.e. a connection to and/or from the data repository A (135)) in which a user is logged into the system (100) with single-realm, multi-realm, or unconstrained read and write access to data in the data repository A (135). See STEPS 400-430 for further details.

In STEP 805, a read request associated with global data may be received (e.g. from a user). The read request may be directed towards data associated with a realm that the user has access to. Global data (e.g. country codes, state abbreviations, government loading codes, public information, and the like) may be accessible to all users in single-realm, multi-realm, and unconstrained sessions.

In STEP 810, the read operation may be performed on the global data (e.g. by the data repository A (135)). The read operation will only affect filtered global objects and data, and will not be performed on data that is not in the read request. Global data may be readable by all users.

In STEP 815, the session may be ended (e.g. by logging out the user). Ending a session concludes the use of any user credentials, realm IDs, identifiers, and connections that were obtained or established during a session.

In STEP 820, a read request associated with the global data may be received (e.g. from the user).

In STEP 825, the read request may be denied (e.g. because the sessions has ended). Since the session has been ended, the user no longer has any active user credentials, realm IDs, identifiers, or connections, without which data is no longer accessible (i.e. not even global data).

Figure 9:
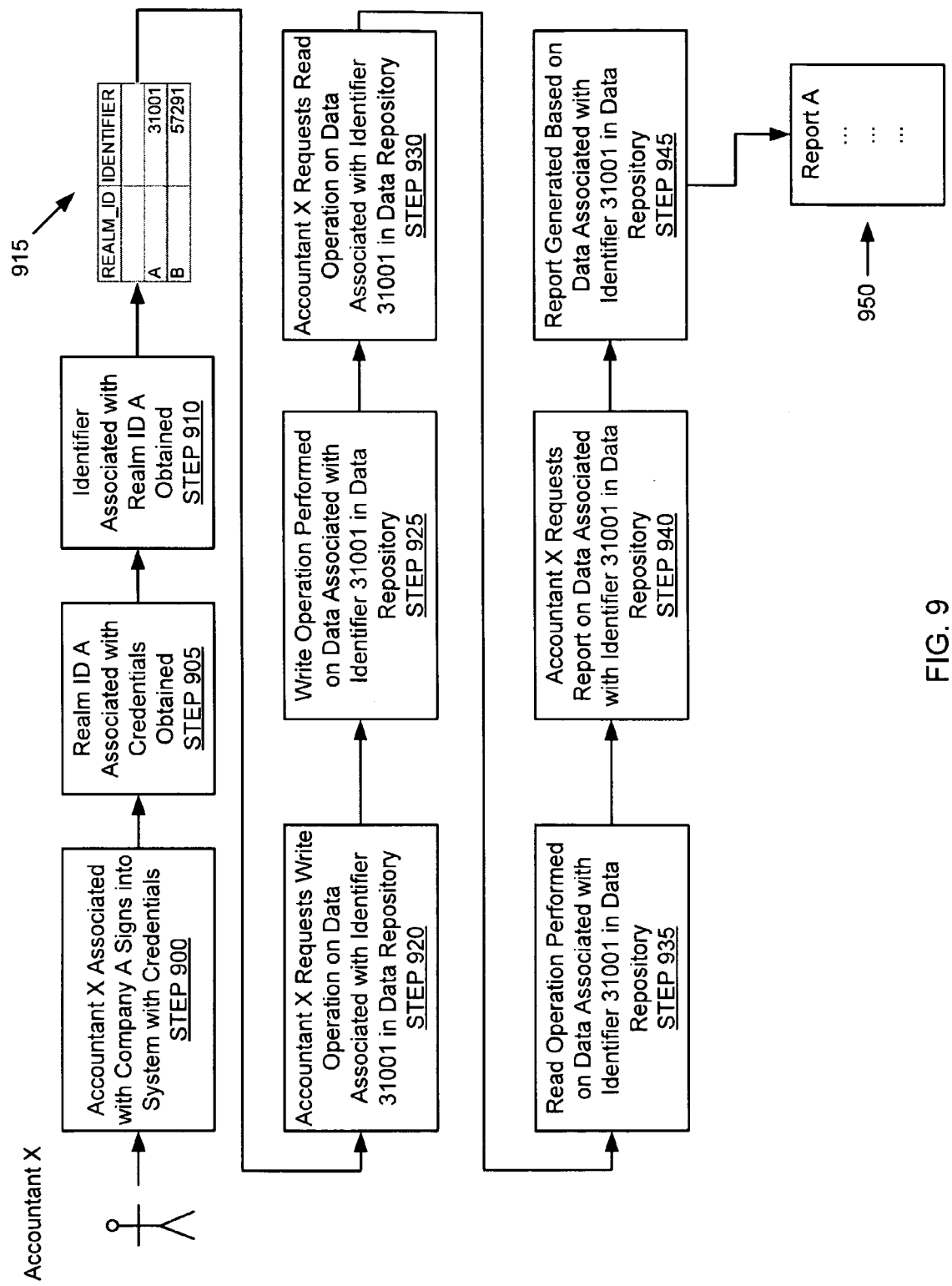
FIGS. 9-11 show flow diagrams of examples in accordance with one or more embodiments of the invention.

FIG. 9 shows an example depicting single-realm read/write access of system (100) in accordance with one or more embodiments of the invention. The process shown in FIG. 9 may be used, for example, with the system (100), for managing multi-tenancy database single-realm read/write access. Those skilled in the art will appreciate that the sequence of steps shown in FIG. 9 may differ among embodiments of the invention, and that one or more of the steps may be optional.

In STEP 900, an accountant X associated with company A signs into system (100) with credentials. The accountant may have single-realm read/write access to the system (100) through company A. See STEP 300 for further details on credentials. Also, the accountant's credentials may be validated (e.g. by the authentication module (130)). See STEP 305 for further details on the validation of the credentials.

In STEP 905, the realm ID A associated with the credentials supplied by the accountant is obtained. The realm ID A may be obtained by the authentication module (130) according to its association with the user credentials. As previously described, each user credential-realm ID set stored in the authentication module (130) is unique, and therefore once the user credentials are obtained, the corresponding realm ID A may be uniquely identified. The realm ID A may be uniquely associated with a realm A of data access.

In STEP 910, the identifier associated with realm ID A is obtained (e.g. from the data repository A (135)). The identifier may be identified according to its association with the realm ID. As previously described, each identifier-realm ID set stored in the data repository A (135) is unique, and therefore once realm ID A is obtained, the corresponding identifier may be uniquely identified.

Table 915 illustrates a data structure in the data repository A (135) that contains realm IDs and associated identifiers. For example, realm ID A may be associated with identifier 31001, and realm ID B may be associated with identifier 57291.

In STEP 920, a write operation on data associated with identifier 31001 is requested by accountant X. The write request may be directed towards data associated with realm A which the user has access to. As previously described, the user will not have access to write to data that is not associated with realm A.

In STEP 925, the write operation on data associated with identifier 31001 is performed. Prior to being performed, the write request is approved based on identifier 31001 associated with realm ID A (e.g. by the realm data access module (120)). During this process, data may be filtered from the data repository A (135) to include only data and objects that are associated with realm and realm ID A. After being approved, the write operation may be performed on objects in the data repository (e.g. by the data repository A (135)). The write operation will only affect the filtered objects and data, and will not be performed on data that is not within realm A associated with realm ID A and identifier 31001.

In STEP 930, a read operation on data associated with identifier 31001 is requested by accountant X. The read request may be directed towards data associated with realm A. As previously described, the user will not have access to read data that is not associated with realm A.

In STEP 935, the read operation on data associated with identifier 31001 is performed. Prior to performing the read operation, objects in the data repository A (135) may be filtered for access based on identifier 31001 associated with a realm ID A (e.g. by the data repository A (135)). When data is read from the data repository A (135), it is filtered to include only data and objects that are associated with realm and realm ID A. The user therefore cannot see data and objects associated with other realms. After filtering objects in the data repository A (135), the read operation may be performed on the filtered objects (e.g. by the data repository A (135)). The read operation will only affect the filtered objects and data, and will not be performed on data that is not within realm A associated with realm ID A and identifier 31001.

In STEP 940, a report on data associated with identifier 31001 is requested by accountant X. Accountant X may specify details associated with the report (e.g. format, style, length, category, depth, font, color, data to be included, data to be excluded, and the like). The report may be based on the details specified by accountant X. Those skilled in the art will appreciate that there will be many other details that may be specified that have not been described.

In STEP 945, report (950) is generated based on data associated with identifier 3100 in the data repository A (135). The generated report (950) (e.g. report A) may be in a spreadsheet format, similar to FIG. 2. The report (950) may also contain data organized according to value (e.g. realm ID, identifier, name, class, type, and the like). The report (950) may also contain figures, charts, diagrams, and other means of data presentation. Subsequent to generation, the report (950) may be delivered to the accountant X via many methods (e.g. email, SMS, a hyperlink to a URL, voicemail, a mobile application, a display, postal mail, and the like). Those skilled in the art will appreciate that the data presented in the report (950) may be organized, formatted, and delivered in various other ways not described.

Figure 10:
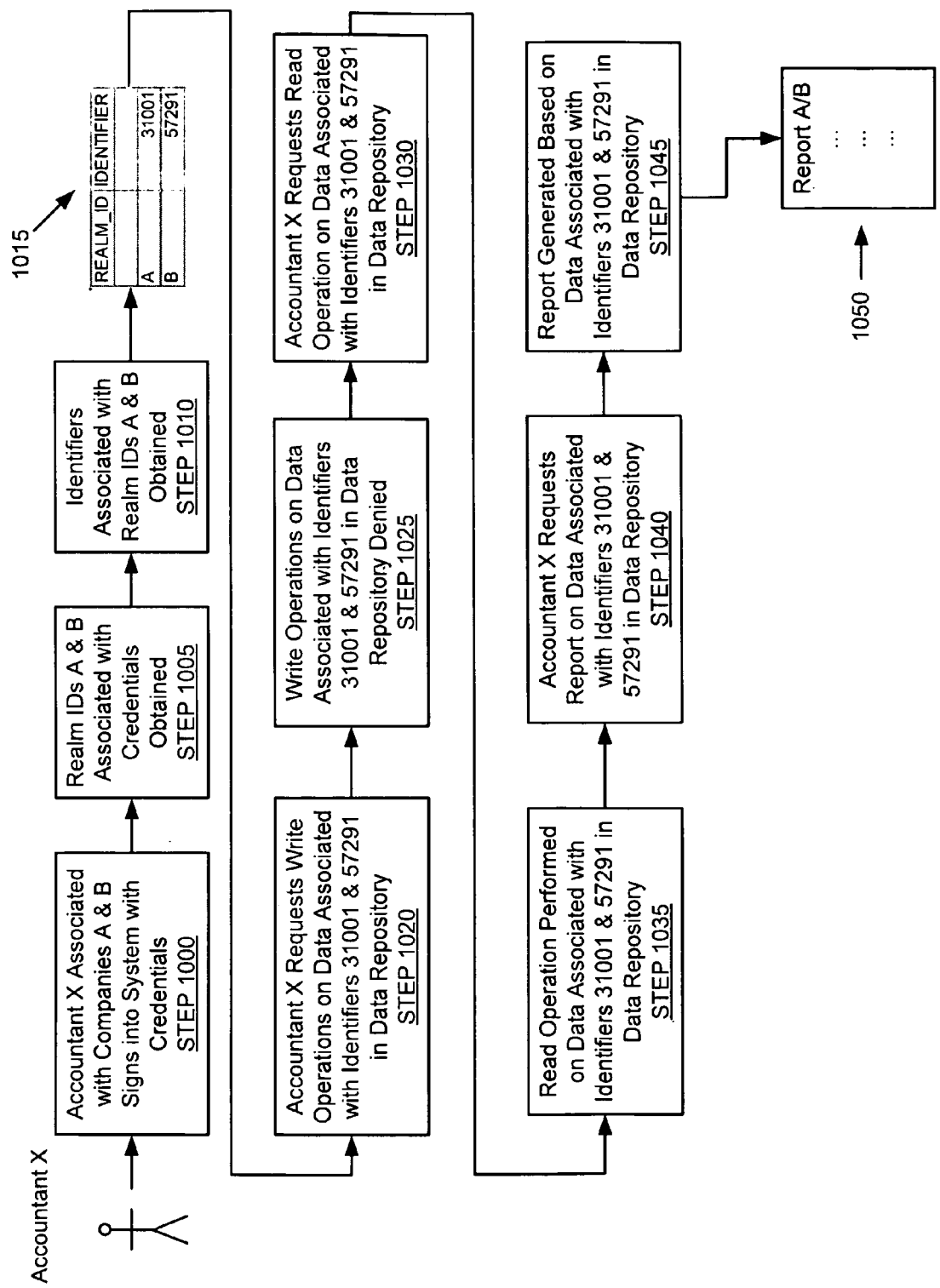

FIG. 10 shows an example depicting multi-realm read only access of system (100) in accordance with one or more embodiments of the invention. The process shown in FIG. 10 may be used, for example, with the system (100), for managing multi-tenancy database multi-realm read only access. Those skilled in the art will appreciate that the sequence of steps shown in FIG. 10 may differ among embodiments of the invention, and that one or more of the steps may be optional.

In STEP 1000, an accountant X associated with companies A and B signs into system (100) with credentials. The accountant X may have multi-realm read only access to the system (100) through companies A and B. See STEP 300 for further details on credentials. Also, the accountant's credentials may be validated (e.g. by the authentication module (130)). See STEP 305 for further details on the validation of the credentials.

In STEP 1005, the realm IDs A and B associated with the credentials supplied by the accountant are obtained. Realm IDs A and B may be obtained by the authentication module (130) according to its association with the user credentials. As previously described, each user credential-realm ID set stored in the authentication module (130) is unique, and therefore once the user credentials are obtained, the corresponding realm IDs A and B may be uniquely identified. Realm IDs A and B may be uniquely associated with realms A and B of data access.

In STEP 1010, the identifiers associated with realm IDs A and B are obtained. The identifier may be identified according to its association with realm IDs A and B. As previously described, each identifier-realm ID set stored in the data repository A (135) is unique, and therefore once realm IDs A and B are obtained, the corresponding identifiers may be uniquely identified.

Table 1015 illustrates a data structure in the data repository A (135) that contains realm IDs and associated identifiers. For example, realm ID A may be associated with identifier 31001, and realm ID B may be associated with identifier 57291.

In STEP 1020, write operations on data associated with identifiers 31001 and 57291 are requested by accountant X. The write requests may be directed towards data associated with realms A and B that the user has access to. As previously described, the user will not have access to write to data that is not associated with realms A or B.

In STEP 1025, write operation on data associated with identifiers 31001 and 57291 are denied. Prior to being denied, the write request is queried based on identifiers 31001 and 57291 associated with realm IDs A and B (e.g. by the realm data access module (120)). The write operation may be denied and may not be performed on data that is not within the realm scope associated with the current realms (e.g. realms A and B). Multi-realm read only access does not allow write operations to be performed on data.

In STEP 1030, read operations on data associated with identifiers 31001 and 57291 are requested by accountant X. The read request may be directed towards data associated with realms A and B. As previously described, the user will not have access to read data that is not associated with realms A and B.

In STEP 1035, read operations on data associated with identifiers 31001 and 57291 are performed. Prior to performing the read operation, objects in the data repository A (135) may be filtered for access based on identifiers 31001 and 57291 associated with a realm IDs A and B (e.g. by the data repository A (135)). When data is read from the data repository A (135), it is filtered to include only data and objects that are associated with realm and realm IDs A and B. The user therefore cannot see data and objects associated with other realms. After filtering objects in the data repository A (135), the read operation may be performed on the filtered objects (e.g. by the data repository A (135)). The read operation will only affect the filtered objects and data, and will not be performed on data that is not within realms A and B associated with realm ID A and identifier 31001, and realm ID B and identifier 57291, respectively.

In STEP 1040, a report on data associated with identifiers 31001 and 57291 is requested by accountant X. See STEP 940 for further details on the report.

In STEP 1045, the report (1050) (e.g. report A/B) is generated based on data associated with identifiers 3100 and 57291 in the data repository A (135). See STEP 945 for further details on the report (1050).

Figure 11:
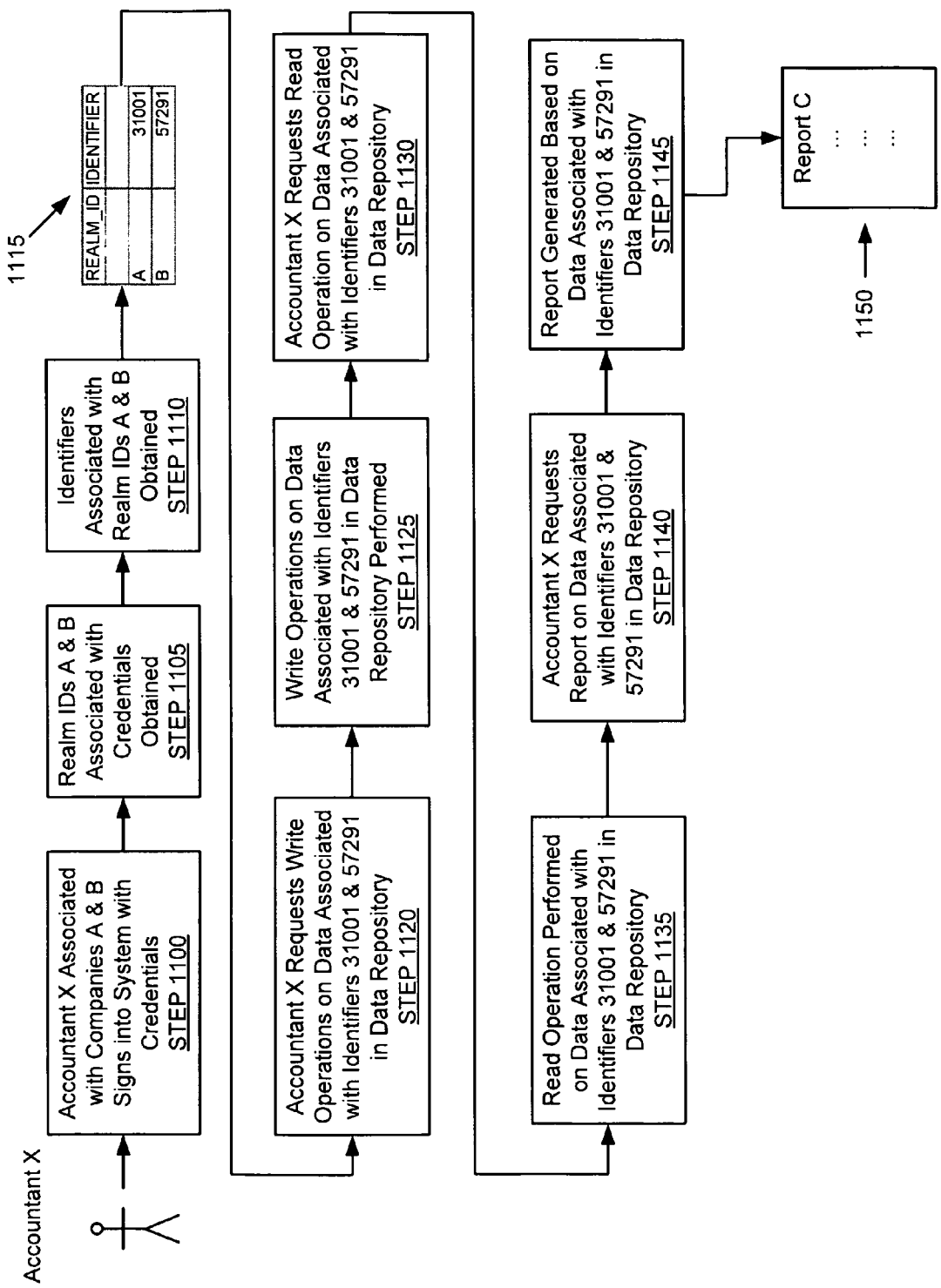

FIG. 11 shows an example depicting super user access of system (100) in accordance with one or more embodiments of the invention. The process shown in FIG. 11 may be used, for example, with the system (100), for managing multi-tenancy database super user access. Those skilled in the art will appreciate that the sequence of steps shown in FIG. 11 may differ among embodiments of the invention, and that one or more of the steps may be optional.

In STEP 1100, an accountant X associated with companies A and B signs into system (100) with credentials. The accountant X may have super user access to the system (100) through companies A and B. See STEP 300 for further details on credentials. Also, the accountant's credentials may be validated (e.g. by the authentication module (130)). See STEP 305 for further details on the validation of the credentials.

In STEP 1105, the realm IDs A and B associated with the credentials supplied by the accountant are obtained. Realm IDs A and B may be obtained by the authentication module (130) according to its association with the user credentials. As previously described, each user credential-realm ID set stored in the authentication module (130) is unique, and therefore once the user credentials are obtained, the corresponding realm IDs A and B may be uniquely identified. Realm IDs A and B may be uniquely associated with realms A and B of data access.

In STEP 1110, the identifiers associated with realm IDs A and B are obtained. The identifier may be identified according to its association with realm IDs A and B. As previously described, each identifier-realm ID set stored in the data repository A (135) is unique, and therefore once realm IDs A and B are obtained, the corresponding identifiers may be uniquely identified.

Table 1115 illustrates a data structure in the data repository A (135) that contains realm IDs and associated identifiers. For example, realm ID A may be associated with identifier 31001, and realm ID B may be associated with identifier 57291.

In STEP 1120, write operations on data associated with identifiers 31001 and 57291 are requested by accountant X. The write requests may be directed towards data associated with realms A and B that the super user has access to. In the case of a super user, all realms may be accessible to the user.

In STEP 1125, write operation on data associated with identifiers 31001 and 57291 are performed. Prior to being performed, the write request is approved based on identifiers 31001 and 57291 associated with realm IDs A and B (e.g. by the realm data access module (120)). During this process, data may be filtered from the data repository A (135) to include only data and objects that are associated with realm and realm IDs A and B. After being approved, the write operation may be performed on objects in the data repository (e.g. by the data repository A (135)). The write operation will only affect the filtered objects and data, and will not be performed on data that is not within realms A or B associated with realm ID A and identifier 31001, and realm ID B and identifier 57291, respectively.

In STEP 1130, read operations on data associated with identifiers 31001 and 57291 are requested by accountant X.

The read request may be directed towards data associated with realms A and B. As a super user, the user will have access to read data that is associated with all realms.

In STEP 1135, read operations on data associated with identifiers 31001 and 57291 are performed. Prior to performing the read operation, objects in the data repository A (135) may be filtered for access based on identifiers 31001 and 57291 associated with a realm IDs A and B (e.g. by the data repository A (135)). When data is read from the data repository A (135), it is filtered to include only data and objects that are associated with realm and realm IDs A and B. After filtering objects in the data repository A (135), the read operation may be performed on the filtered objects (e.g. by the data repository A (135)). The read operation will only affect the filtered objects and data, and will not be performed on data that is not within realms A and B associated with realm ID A and identifier 31001, and realm ID B and identifier 57291, respectively. Even though the read operation will only be performed on this data set, the super user may have access to read all data in the data repository A (135).

In STEP 1140, a report on data associated with identifiers 31001 and 57291 is requested by accountant X. See STEP 940 for further details on the report.

In STEP 1145, the report (1150) (e.g. report C) is generated based on data associated with identifiers 3100 and 57291 in the data repository A (135). See STEP 945 for further details on the report (1150).

Figure 12:
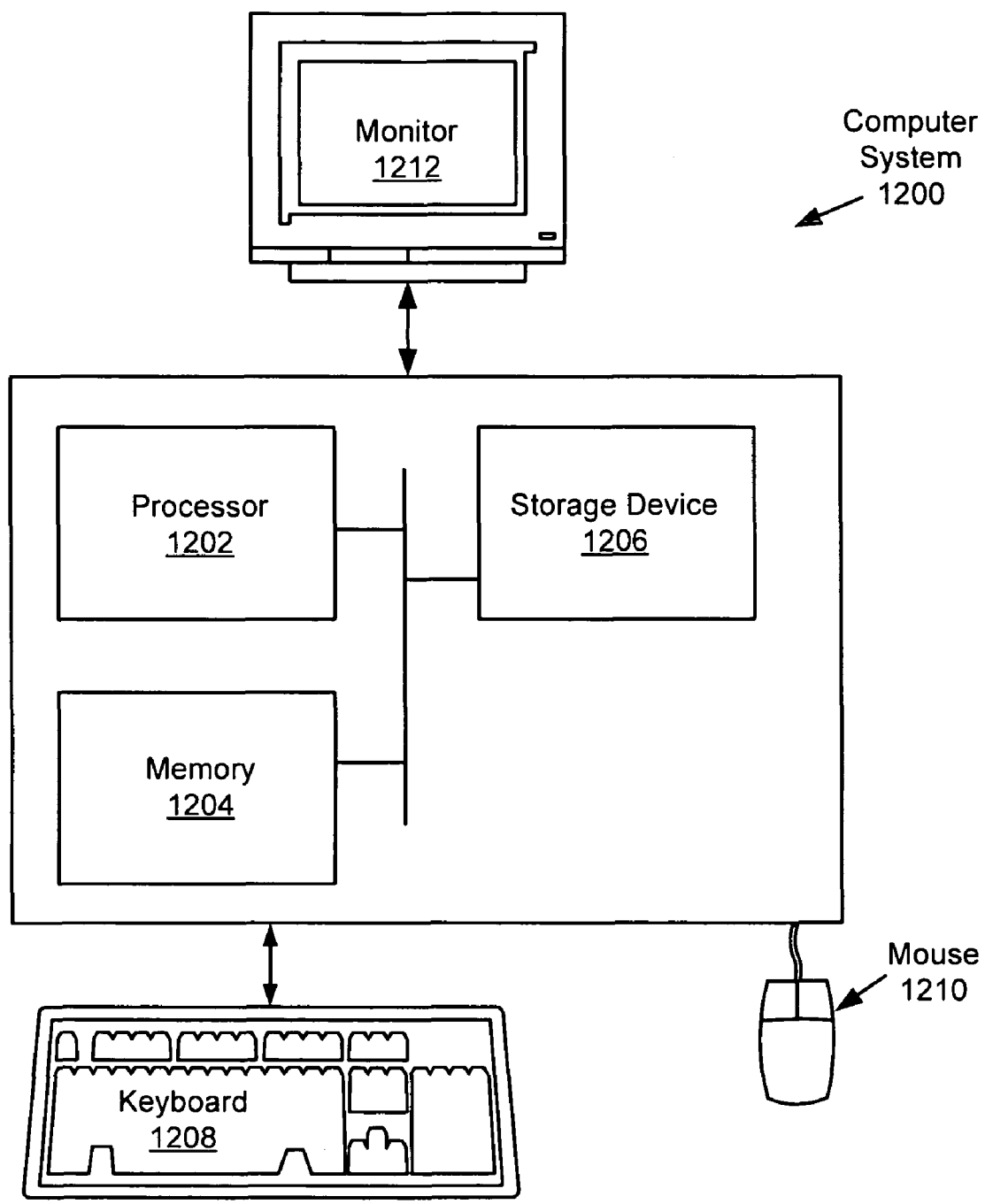
FIG. 12 shows a computer system in accordance with one or more embodiments of the invention.

The invention may be implemented on virtually any type of computer regardless of the platform being used. For example, as shown in FIG. 12, a computer system (1200) includes a processor (1202), associated memory (1204), a storage device (1206), and numerous other elements and functionalities typical of today's computers (not shown). The computer system (1200) may also include input means, such as a keyboard (1208) and a mouse (1210), and output means, such as a monitor (1212). The computer system (1200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (1200) may be located at a remote location and connected to the other elements over a network. Further, the invention may be implemented on a distributed system having a plurality of nodes, where each portion of the invention (e.g., object store layer, communication layer, logic layer, and the like) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing multi-tenancy database access, comprising:
    receiving credentials from a user associated with a first organization and a second organization, wherein the first organization is associated with a first realm of data access, and wherein the second organization is associated with a second realm of data access;
    validating the credentials received from the user;
    logging the user into an access module residing in memory upon validating the user;
    generating a first realm ID associated with the credentials and a first access type permitting the user access to a first predetermined set of data defined by the first realm of data access, wherein the first predetermined set of data is stored in a multi-tenancy data repository;
    generating a second realm ID associated with the credentials and a second access type permitting the user access to a second predetermined set of data defined by the second realm of data access, wherein the second predetermined set of data is stored in the multi-tenancy data repository;
    storing the first realm ID, the second realm ID, and the credentials in an authentication module;
    generating a connection request after storing the first realm ID, the second realm ID, and the credentials;
    establishing a connection from the access module to the multi-tenancy data repository based on the connection request;
    generating a first identifier associated with the first realm ID and a second identifier associated with the second realm ID after establishing the connection;
    storing the first identifier, the first realm ID, the second identifier, and the second realm ID in the multi-tenancy data repository;
    receiving a single write request to perform a write operation on both the first predetermined set of data and the second predetermined set of data from the user;
    performing a verification of the single write request based on the first identifier, the second identifier, the first access type, and the second access type;
    approving the single write request based on the verification of the single write request; and
    performing the write operation on the first predetermined set of data and the second predetermined set of data in the multi-tenancy data repository after approval of the single write request.

2. The method of claim 1, wherein the first access type is single-realm write, wherein single-realm write permits the user read and write access to the first predetermined set of data.

3. The method of claim 2, further comprising:
    receiving a read request to perform a read operation on the first predetermined set of data from the user;
    performing a verification of the read request based on the first identifier and the first access type;
    approving the read request based on the verification of the read request; and
    performing the read operation on the first predetermined set of data after approval of the read request.

4. The method of claim 1,
    wherein the second access type is unconstrained, and
    wherein unconstrained permits the user to perform all data operations on the second predetermined set of data defined by the second realm of data access.

5. The method of claim 4, further comprising:
    receiving a special operation request to perform a special operation on the first predetermined set of data and the second predetermined set of data from the user;

performing a verification of the special operation request based on the first identifier, the second identifier, the first access type, and the second access type;

approving the second operation request based on the verification of the special operation request; and performing the special operation on the first predetermined set of data and the second predetermined set of data after approval of the special operation request.

6. The method of claim 5, wherein the special operation consists of a read operation on the first predetermined set of data and a write operation on the second predetermined set of data.

7. The method of claim 1, further comprising:

receiving a read request to perform a read operation on the first predetermined set of data and the second predetermined set of data defined by the second realm of data access from the user;

performing a verification of the read request based on the first identifier, the second identifier, the first access type, and the second access type;

approving the read request based on the verification of the read request; and performing the read operation on the first predetermined set of data and the second predetermined set of data after approval of the read request, wherein the read request to perform the operation is associated with global data, and wherein the global data is visible to any user.

8. The method of claim 7, further comprising:

logging out the user;

receiving the read request to perform the read operation on the first predetermined set of data and the second predetermined set of data from the user;

performing a verification of the read request based on the first identifier, the second identifier, the first access type, and the second access type; and denying the read request based on the verification.

9. A system for managing multi-tenancy database access, comprising:

a processor;

a memory operatively connected to the processor;

a user interface, resident in memory and configured to:

receive credentials from a user; and receive, from the user, a single write request to perform a write operation on both a first predetermined set of data of a first organization and a second predetermined set of data of a second organization, wherein the first organization is associated with a first realm of data access, wherein the second organization is associated with a second realm of data access, and wherein the first predetermined set of data and the second predetermined set of data are both stored in a multi-tenancy data repository;

an access module, resident in memory and configured to:

validate the credentials after receiving the credentials;

log in the user based on the validation;

determine, after logging in the user, a first realm ID associated with the credentials and a first access type permitting the user access to the first predetermined set of data defined by the first realm of data access;

determine a second realm ID associated with the credentials and a second access type permitting the user access to the second predetermined set of data defined by the second realm of data access;

generate a connection request and establish a connection to the multi-tenancy data repository after determining the first realm ID and the second realm ID;

obtain a first identifier associated with the first realm ID and a second identifier associated with the second realm ID after establishing the connection;

determine a scope of data access based on the first predetermined set of data defined by the first realm of data access and the second predetermined set of data defined by the second realm of data access;

verify the request according to the scope;

an authentication module, resident in memory and configured to:

authenticate the credentials; and the multi-tenancy data repository performing the write operation on both the first predetermined set of data and the second predetermined set of data in response to the single write request after verification and according to the scope.

10. The system of claim 9, wherein the authentication module is further configured to:

generate the first realm ID associated with the credentials; and store the first realm ID and the credentials.

11. The system of claim 9, wherein the data repository is further configured to:

generate the first identifier associated with the first realm ID; and store the first identifier and the first realm ID.

12. The system of claim 9, wherein the multi-tenancy data repository is further configured to:

conceal and protect the first predetermined set of data from an unauthenticated user that attempts to access the first predetermined set of data in the multi-tenancy data repository without authentication of the credentials.

13. The system of claim 9, wherein the user interface is viewable in a web browser.

14. The system of claim 9, wherein the user is further associated with a third organization, wherein the third organization is associated with a third realm of data access, and wherein the access module is further configured to:

receive a second request to perform a second operation on a third predetermined set of data defined by the third realm of data access from the user;

verify the second request according to the scope; and perform the second operation on the third predetermined set of data in response to the second request after verification, according to the scope, wherein validation of the credentials is performed one time in a session.

* * * * *